(12) United States Patent
Maenishi et al.

(10) Patent No.: US 8,815,455 B2
(45) Date of Patent: Aug. 26, 2014

(54) HYDROGEN GENERATOR AND FUEL CELL POWER GENERATOR

(75) Inventors: Akira Maenishi, Kadoma (JP); Yuuji Mukai, Kadoma (JP); Hiroki Fujioka, Kadoma (JP)

(73) Assignee: Panasonic Corporation, Osaka (JP)

( * ) Notice: Subject to any disclaimer, the term of this patent is extended or adjusted under 35 U.S.C. 154(b) by 641 days.

(21) Appl. No.: 12/992,338

(22) PCT Filed: May 13, 2009

(86) PCT No.: PCT/JP2009/002095
§ 371 (c)(1),
(2), (4) Date: Nov. 12, 2010

(87) PCT Pub. No.: WO2009/139159
PCT Pub. Date: Nov. 19, 2009

(65) Prior Publication Data
US 2011/0065011 A1     Mar. 17, 2011

(30) Foreign Application Priority Data

May 15, 2008  (JP) ................................. 2008-128024

(51) Int. Cl.
*H01M 8/06*  (2006.01)

(52) U.S. Cl.
USPC ........... 429/412; 429/423; 429/411; 429/414; 429/416; 429/420; 422/187; 422/198; 422/173; 422/177; 422/211

(58) Field of Classification Search
CPC .......................... H01M 8/0612; H01M 8/0631
USPC ................. 429/423, 412, 411, 414, 416, 420; 422/187, 198, 173, 177, 211
See application file for complete search history.

(56) References Cited

U.S. PATENT DOCUMENTS 7,232,471 B2    6/2007  Tamura et al.
7,891,415 B2 *  2/2011  Ushio et al. ................... 429/120
(Continued)

FOREIGN PATENT DOCUMENTS

| CN | 1497757 A | 5/2004 |
|---|---|---|
| JP | 08-165103 A | 6/1996 |
| JP | 09-306532 A | 11/1997 |
| JP | 2003-187849 A | 7/2003 |
| JP | 2004-512650 A | 4/2004 |

(Continued)

OTHER PUBLICATIONS

International Search Report for International Application No. PCT/JP2009/002095, dated Aug. 18, 2009, 2 pages.

*Primary Examiner* — Milton I Cano
*Assistant Examiner* — Ling R Zeng
(74) *Attorney, Agent, or Firm* — Brinks Gilson & Lione (57) ABSTRACT

A hydrogen generator includes: a water evaporation unit configured to mix water with a raw gas; a burner; a combustion exhaust gas flow channel provided on an inner side than the water evaporation unit and through which a combustion exhaust gas from the burner flows; a reforming catalyst layer configured to produce a reformed gas; and a carbon monoxide reduction unit configured to reduce an amount of carbon monoxide contained in the reformed gas. The water evaporation unit includes a flow channel member defining a flow channel through which the raw gas and the water flow. A pitch of the flow channel member is changed according to at least one of an amount of heat exchange between the combustion exhaust gas flow channel and the water evaporation unit and an amount of heat exchange between the water evaporation unit and the carbon monoxide reduction unit.

3 Claims, 3 Drawing Sheets

(56) References Cited

U.S. PATENT DOCUMENTS

| | | |
|---|---|---|
| 2002/0098394 A1 | 7/2002 | Keefer et al. |
| 2006/0182680 A1 | 8/2006 | Keefer et al. |
| 2009/0087705 A1 * | 4/2009 | Fuju et al. ..................... 429/20 |
| 2009/0317671 A1 | 12/2009 | Ukai et al. |

FOREIGN PATENT DOCUMENTS

| | | | |
|---|---|---|---|
| JP | 2007-055892 A | | 3/2007 |
| JP | 2007055892 A | * | 3/2007 |
| JP | WO 2007-145218 A1 | | 12/2007 |
| JP | 2008-063171 A | | 3/2008 |

* cited by examiner

HYDROGEN GENERATOR AND FUEL CELL POWER GENERATOR

TECHNICAL FIELD

The present invention relates to a hydrogen generator configured to generate a produced gas containing a high concentration of hydrogen by using a hydrocarbon fuel, such as a town gas and an LPG, as a raw gas, and also relates to a fuel cell power generator including a fuel cell configured to generate electric power by using hydrogen produced by the hydrogen generator.

BACKGROUND ART

The fuel cell power generator mainly includes: a hydrogen generator configured to generate a produced gas containing a high concentration of hydrogen; and a fuel cell configured to generate electric power by using hydrogen generated by the hydrogen generator.

The hydrogen generator includes: a reforming unit configured to generate a reformed gas containing hydrogen, methane, carbon monoxide (in an amount of about 10 to 15%), carbon dioxide and steam by subjecting a raw gas and steam to steam-reforming reaction using a reforming catalyst in which a hydrocarbon fuel, such as a town gas and an LPG, is used as the raw gas; and a CO elimination unit configured to eliminate carbon monoxide exhibiting poisoning action to a fuel cell from the reformed gas.

When a proton exchange membrane fuel cell is used as a fuel cell, a concentration of carbon monoxide contained in the reformed gas is required to be eliminated to about 10 ppm. Generally, the CO elimination unit includes two-stage units which includes: a conversion unit configured to eliminate carbon monoxide to about 0.5% by shift reaction using a conversion catalyst; and a selective oxidation unit configured to mix carbon monoxide and oxygen by using a selective oxidation catalyst, thereby oxidizing carbon monoxide through selective oxidation reaction and reducing the concentration of CO to 10 ppm or less.

From the viewpoint of a reduction of the size, enhancement of efficiency, enhancement of a start-up characteristic, enhancement of driving stability, and a cost reduction attributable to simplification of a structure, various devices is proposed as a hydrogen generator. As an example thereof, in order to realize a compact, highly efficient hydrogen generator, there is provided a hydrogen generator including a reforming unit and a CO elimination unit which are integrated and also a water evaporation unit which is provided integrally adjacent to a catalyst layer rather than being provided outside the hydrogen generator. According to the structure, an optimum heat balance and stable operation are achieved while heat in the hydrogen generator is utilized to the maximum level, thereby reducing the size of the structure of the hydrogen generator and also reducing cost of the hydrogen generator.

However, when an operating state of the hydrogen generator (for example, power generation load on a fuel cell in a hydrogen generator built in a fuel cell system) changes, an amount of hydrogen to be generated is reduced or increased by changing a raw material supply amount and a water supply amount. When the water supply amount is changed from a small amount to a large amount, a larger amount of water is fed to the water evaporation unit.

The water evaporation unit is configured to balance so as to evaporate water by heat of a combustion exhaust gas from a burner surrounding the water evaporation unit and heat of a catalyst layer. However, when a large amount of water is suddenly supplied, the supplied water is not fully evaporated according to circumstances, whereby some of unvaporized water may be supplied to a reforming catalyst in the form of a droplet.

When the droplets are supplied to the reforming catalyst, the droplets absorb latent heat of the reforming catalyst during evaporation of the droplets, so that the temperature of the reforming catalyst locally and suddenly falls. The temperature fall also induces a fall in the temperature of the catalysis located in surrounding areas. As a result, the transforming catalyst as a whole can not maintain a stable temperature state thereof, which may cause fluctuations in the amount of hydrogen generated.

In the catalyst supplied with the droplets, an instantaneous temperature fall, so that the catalyst may receive thermal shock, and cracking or exfoliation may occur. Accordingly, in a related-art structure, a second evaporation unit is provided in a lower portion of a downstream side of the water evaporation unit, and a partition wall is provided on the lower portion and the side portion of the second evaporation unit. According to the structure, even if droplets are ejected from the evaporation unit, the droplets will be trapped by the lower portion of the second evaporation unit, and only the steam generated by evaporating droplets which have been trapped is sent from the second evaporation unit (see, for example, Patent Document 1).

PRIOR ART DOCUMENT

Patent Document

Patent Document 1: JP-A-2008-63171

SUMMARY OF THE INVENTION

Problem to be Solved by the Invention

However, an increase in the number of components and complication of the structure may lead to an increase in cost of components or manufacturing cost. Further, when an evaporation unit that is sufficiently long enough to complete evaporation of water is formed without use of such a trapping structure, the size of the entirety of the hydrogen generator increases, and the surface area of the generator also becomes large. Thus, an amount of heat discharge becomes greater, which deteriorates the efficiency of the hydrogen generator (i.e., effective utilization of heat). Further, an increase in the size of the generator also leads to a cost increase, so that a value of the hydrogen generator is degraded.

Further, when a flow channel of a water evaporation unit is formed as a single unit by a configuration in which the evaporation unit and a catalyst layer are provided adjacent to each other (Patent Document 1), the catalyst layer and the evaporation unit uniformly exchange heat in a direction of flow of the catalyst layer. In the catalyst layer such as a conversion catalyst layer and a selective oxidation catalyst layer, conversion reaction or a selective oxidation reaction occurs in an upstream portion of the catalyst layer which is an immediate neighborhood of its entrance. Therefore, the temperature of the upstream portion of the catalyst layer increases due to heat of reaction. In the meantime, the temperature of a middle flow portion of the catalyst layer or a downstream portion thereof near an exit decreases due to exchange of heat between the catalyst layer and the water evaporation unit.

Therefore, the temperature of the upstream portion of the catalyst layer increases, and the temperature of the downstream portion decreases. The characteristics of the catalyst degrade when a temperature of the catalyst layer is too high and too low. Further, when the temperature of the catalyst layer is too high, the catalyst degrades by high temperature. Consequently, the catalyst has to be used at a heat resistance temperature or below. If a large temperature distribution exists in the catalyst layer, the characteristics of the catalyst may not sufficiently be assured.

An object of the present invention is to provide a hydrogen generator which can appropriately maintaining the temperature of at least one of a reforming catalyst layer, a conversion catalyst layer and a selective oxidizing layer, and which exhibits stable performance.

Means for Solving the Problem

In order to solve the above-mentioned problems, a hydrogen generator according to the present invention comprises: a row material supply unit configured to supply a raw gas; a water supply unit configured to supply water; a water evaporation unit connected to the raw material supply unit and the water supply unit and configured to transform supplied water into steam and to mix the steam with the raw gas; a burner connected to a fuel supply unit configured to supply a fuel gas and an air supply unit configured to supply combustion air; a combustion exhaust gas flow channel which is provided on an inner side than the water evaporation unit and through which a combustion exhaust gas from the burner flows; a reforming catalyst layer configured to receive a gas mixture supplied from the water evaporation unit and produce a reformed gas containing hydrogen by steam-reforming reaction of the gas mixture with a reforming catalyst; and a carbon monoxide reduction unit disposed on an outer side than the water evaporation unit and configured to receive the reformed gas and reduce an amount of carbon monoxide contained in the reformed gas, wherein the water evaporation unit comprises a flow channel member provided on an outer side than the combustion exhaust gas flow channel and defining a flow channel through which the raw gas and the water flow, and wherein a pitch of the flow channel member in the water evaporation unit is changed according to at least one of an amount of heat exchange between the combustion exhaust gas flow channel and the water evaporation unit and an amount of heat exchange between the water evaporation unit and the carbon monoxide reduction unit.

Advantages of the Invention

According to the invention, the pitch of the flow channel member in the water evaporation unit is changed according to at least one of the amount of heat exchange between the combustion exhaust gas flow channel and the water evaporation unit and the amount of heat exchange between the water evaporation unit and the carbon monoxide reduction unit, whereby the temperature of the reforming catalyst layer can be maintained appropriately, and the performance of the hydrogen generator can be stabilized.

BEST MODE FOR CARRYING OUT THE INVENTION

A hydrogen generator of a first invention includes: a row material supply unit configured to supply a raw gas; a water supply unit configured to supply water; a water evaporation unit connected to the raw material supply unit and the water supply unit and configured to transform supplied water into steam and to mix the steam with the raw gas; a burner connected to a fuel supply unit configured to supply a fuel gas and an air supply unit configured to supply combustion air; a combustion exhaust gas flow channel which is provided on an inner side than the water evaporation unit and through which a combustion exhaust gas from the burner flows; a reforming catalyst layer configured to receive a gas mixture supplied from the water evaporation unit and produce a reformed gas containing hydrogen by steam-reforming reaction of the gas mixture with a reforming catalyst; and a carbon monoxide reduction unit disposed on an outer side than the water evaporation unit and configured to receive the reformed gas and reduce an amount of carbon monoxide contained in the reformed gas, wherein the water evaporation unit comprises a flow channel member provided on an outer side than the combustion exhaust gas flow channel and defining a flow channel through which the raw gas and the water flow, and wherein a pitch of the flow channel member in the water evaporation unit is changed according to at least one of an amount of heat exchange between the combustion exhaust gas flow channel and the water evaporation unit and an amount of heat exchange between the water evaporation unit and the carbon monoxide reduction unit.

According to the first invention, the pitch of the flow channel member of the water evaporation unit is changed according to at least one of the amount of heat exchange between the combustion exhaust gas flow channel and the water evaporation unit and the amount of heat exchange between the water evaporation unit and the carbon monoxide reduction unit. The temperature of the reforming catalyst layer and the temperature of the carbon monoxide reduction unit can thereby be maintained appropriately, so that the performance of the hydrogen generator can be stabilized.

According to a second invention, particularly in the hydrogen generator of the first invention, the pitch of the flow channel member in the water evaporation unit is set small at a portion where an increase in at least one of the amount of heat exchange between the combustion exhaust gas flow channel and the water evaporation unit and the amount of heat exchange between the water evaporation unit and the carbon monoxide reduction unit is desired.

According to the second invention, the pitch of the flow channel member in the water evaporation unit is made small at the portion where the increase in the amount of heat exchange is desired, whereby the temperature of the reforming catalyst layer and the temperature of the carbon monoxide reduction unit can be maintained appropriately, which can stabilize the performance of the hydrogen generator.

According to a third invention, particularly in the hydrogen generator of the first or second invention, a downstream portion of the water evaporation unit is configured such that in the amount of heat exchange between the combustion exhaust gas flow channel and the water evaporation unit, the amount of heat exchange between the combustion exhaust gas flow channel and the downstream portion of the water evaporation unit becomes greater than the amount of heat exchange between the combustion exhaust gas flow channel and a portion of the water evaporation unit except the downstream portion thereof.

According to the third invention, the downstream portion of the water evaporation unit is configured such that the amount of heat exchange between the downstream portion of the water evaporation unit and the combustion exhaust gas flow channel becomes greater than the amount of heat exchange between the portion of the water evaporation unit except the downstream portion thereof and the combustion exhaust gas flow channel. Consequently, supply of droplets to the reforming catalyst layer is prevented, which can stabilize the performance of the hydrogen generator.

According to a fourth invention, particularly in the hydrogen generator of any one of the first to third inventions, the flow channel member of the water evaporation unit comprises double cylinders and a helical partition portion sandwiched between the cylinders, and a pitch of the partition portion in the downstream portion of the water evaporation unit is smaller than a pitch of the partition member in the portion of the water evaporation unit except the downstream portion thereof.

According to the fourth invention, the pitch of the partition portion in the downstream portion of the water evaporation unit is made smaller than the pitch of the partition portion in the portion of the water evaporation unit except the downstream portion thereof. Consequently, the amount of heat exchange between the downstream portion of the water evaporation unit and the combustion exhaust gas flow channel can be increased by a simple structure.

According to a fifth invention, particularly in the hydrogen generator of the first or second invention, the carbon monoxide reduction unit comprises a conversion catalyst layer configured to receive the reformed gas and to reduce carbon monoxide in the reformed gas by shift reaction using a conversion catalyst, the conversion catalyst layer is disposed adjacent to an outside of the water evaporation unit, and the conversion catalyst layer is configured such that an amount of heat exchange between the water evaporation unit and an upstream portion of the conversion catalyst layer in a flow of the reformed gas becomes greater than an amount of heat exchange between the water evaporation unit and a portion of the conversion catalyst layer except the upstream portion thereof in the flow of the reformed gas.

According to the fifth invention, the amount of heat exchange between the water evaporation unit and the upstream portion of the conversion catalyst layer in the flow of the reformed gas is made greater than the amount of heat exchange between the water evaporation unit and the portion of the conversion catalyst layer except the upstream portion thereof in the flow of the reformed gas. Accordingly, the temperature distribution of the entire conversion catalyst is made small, thereby bringing the entire conversion catalyst into a state of temperature in which the conversion catalyst easily exhibits most of its features. Thus, stable operation of the hydrogen generator is realized.

According to a sixth invention, particularly in the hydrogen generator of the fifth invention, the flow channel member of the water evaporation unit comprises double cylinders and a helical partition portion sandwiched between the cylinders, and a pitch of the partition portion in the water evaporation unit near the upstream portion of the conversion catalyst layer is smaller than a pitch of the partition portion in the water evaporation unit located adjacent to the portion of the conversion catalyst layer except the upstream portion thereof.

According to the sixth invention, the pitch of the partition portion in the water evaporation unit near the upstream portion of the conversion catalyst layer is smaller than the pitch of the partition portion in the water evaporation unit located adjacent to the conversion catalyst layer except the upstream portion thereof. Consequently, the amount of heat exchange between the water evaporation unit and the upstream portion of the conversion catalyst layer in the flow of the reformed gas can be made greater by a simple structure.

According to a seventh invention, particularly in the hydrogen generator of the first or second invention, the carbon monoxide reduction unit comprises: a conversion catalyst layer configured to receive the reformed gas and to reduce carbon monoxide in the reformed gas by shift reaction using a conversion catalyst; and a selective oxidation catalyst layer to which a converted gas from the conversion catalyst layer is introduced and in which a selective oxidation catalyst reduces carbon monoxide in the converted gas by a supply of an oxidizing agent, the selective oxidation catalyst layer is disposed adjacent to an outside of the water evaporation unit, and an amount of heat exchange between the water evaporation unit and an upstream portion of the selective oxidation catalyst layer in a flow of the reformed gas becomes greater than an amount of heat exchange between the water evaporation unit and a portion of the selective oxidation catalyst layer except the upstream portion thereof in the flow of the reformed gas.

According to the seventh invention, the amount of heat exchange between the water evaporation unit and the upstream portion of the selective oxidation catalyst layer in the flow of the reformed gas is made greater than the amount of heat exchange between the water evaporation unit and the portion of the selective oxidation catalyst layer except the upstream portion thereof in the flow of the reformed gas. Accordingly, the temperature distribution of the entire selective oxidation catalyst is made small, thereby bringing the entire selective oxidation catalyst into a state of temperature in which the selective oxidation catalyst easily exhibits most of its features. Thus, stable operation of the hydrogen generator is realized.

In a fuel cell power generator of an eighth invention particularly according to the hydrogen generator of the seventh invention, the flow channel member of the water evaporation unit comprises double cylinders and a helical partition portion sandwiched between the cylinders, and wherein a pitch of the partition portion in the water evaporation unit near the upstream portion of the selective oxidation catalyst layer is smaller than a pitch of the partition portion in the water evaporation unit adjacent to the portion of the selective oxidation catalyst layer except the upstream portion thereof.

According to the eighth invention, the pitch of the partition portion near the upstream portion of the selective oxidation catalyst layer is made smaller than the pitch of the partition portion in the portion of the selective oxidation catalyst layer except the upstream portion thereof. The amount of heat exchange between the water evaporation unit and the upstream portion of the selective oxidation catalyst layer in the flow of the reformed gas can be made greater by a simple structure.

In a fuel cell power generator of a ninth invention includes the hydrogen generator of any one of the fourth, sixth and eighth inventions, the helical partition portion includes a metallic round bar.

According to the ninth invention, the helical partition portion can be made by a simple structure.

A fuel cell power generator of the tenth invention includes the hydrogen generator in any one of the first to ninth inventions.

According to the tenth invention, the fuel cell power generator can stably be operated by providing the hydrogen generator that implements performance of stable operation.

Embodiments of the invention are hereunder described by reference to the drawings.

First Embodiment

Figure 1:
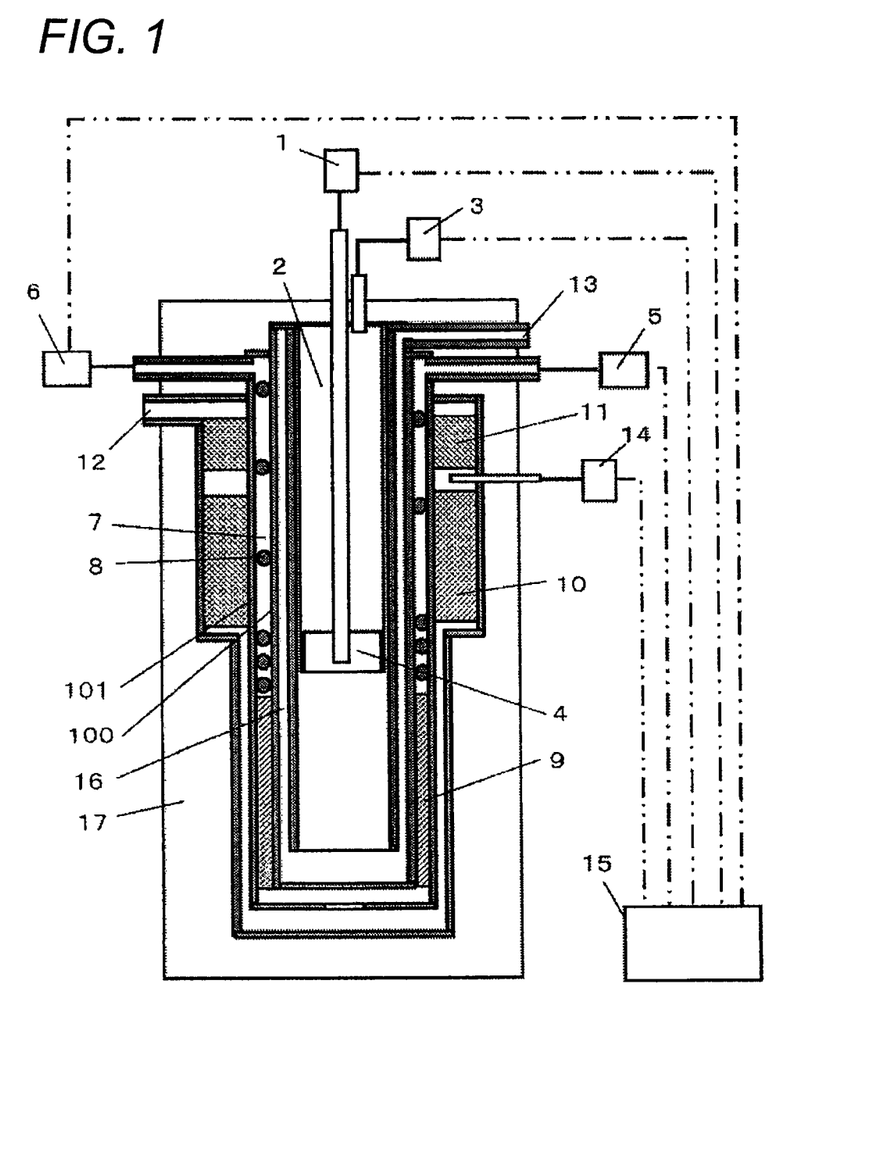
FIG. 1 is a schematic diagram showing a hydrogen generator of a first embodiment of the present invention.

FIG. 1 shows a hydrogen generator of a first embodiment of the present invention. The hydrogen generator includes a burner 4. The burner 4 mixes a fuel gas supplied from a fuel gas supply unit 1 with air supplied from an air fan 3 and delivered via an air flow channel 2, thereby building a fire. A combustion exhaust gas generated by the burner 4 flows into a combustion exhaust gas flow channel 16 located inside a cylinder 100 and is discharged outside the hydrogen generator via an outlet 13.

A water evaporation unit 7 is placed outside the combustion exhaust gas flow channel 16. The water evaporation unit 7 receives a raw gas from a raw gas supply unit 5 and water from a water supply unit 6 and mixes the supplied water, as steam, with the raw gas. The water evaporation unit 7 is structured such that a metallic round bar 8 serving as a helical partition portion is sandwiched between the cylinder 100 and a cylinder 101 so as to form a space between the round bar 8 and that the raw gas and the water are guided through the space along the round bar 8. Accordingly, the space of the water evaporation unit 7 is partitioned by the helical round bar 8, to thus form a helical flow channel surrounding an outer periphery of the cylinder 100. In other words, the water evaporation unit 7 includes the metallic round bar 8 disposed outside the combustion exhaust gas flow channel 16 and serving as a flow channel member through which the raw gas and water flow.

In order to effectively utilize combustion heat of the burner 4, the generator as a whole is covered with a heat insulating material 17.

A helical pitch of the round bar 8 in a downstream portion of the water evaporation unit 7 is made smaller than a helical pitch of the round bar 8 in an intermediate stream portion of the water evaporation unit 7 and a helical pitch of the round bar 8 in an upstream portion thereof. The gas mixture containing the raw material gas and the steam and sent from the water evaporation unit 7 is supplied to a reforming catalyst layer 9 located outside the combustion exhaust gas flow channel 16 and in the lower portion of the water evaporation unit 7.

A reformed gas sent from the reforming catalyst layer 9 is supplied to a conversion catalyst layer 10 placed outside the water evaporation unit 7. Further, a converted gas sent from the conversion catalyst layer 10 is mixed with the air from a selective oxidized air supply unit 14 and subsequently supplied to a selective oxidization catalyst layer 11 situated in an upper portion of the conversion catalyst layer 10 outside the water evaporation unit 7. The produced gas from the selective oxidation catalyst layer 11 is sent from the hydrogen generator via a produced gas exit 12 as a produced gas containing a high concentration of hydrogen with carbon monoxide in an amount of 10 ppm or less. The conversion catalyst layer 10 receives a reformed gas and reduces carbon monoxide in the reformed gas by shift reaction of the conversion catalyst. The converted gas flows from the conversion catalyst layer 10 and into the selective oxidation catalyst layer 11, and an oxidizing agent is supplied to the selective oxidation catalyst layer 11, whereby the selective oxidation catalyst layer 11 reduces carbon monoxide in the converted gas by means of a selective oxidation catalyst. A combination of the conversion catalyst layer 10 with the selective oxidation catalyst layer 11 is referred to as a carbon monoxide reduction unit. However, the carbon monoxide reduction unit may include at least the conversion catalyst layer 10.

The fuel gas, the air supplied to the burner 4, the raw gas, the water supplied to the water evaporation unit 7, and the selective oxidized air supplied to the converted gas from the conversion catalyst layer 10 can be controlled by the fuel gas supply unit 1, the air fan 3, the raw gas supply unit 5, the water supply unit 6, and the selective oxidized air supply unit 14, by means of a signal from a control unit 15.

The fuel gas supply unit 1, the air fan 3, the raw gas supply unit 5, the water supply unit 6, and the selective oxidized air supply unit 14 are configured so as to be able to regulate flow rates of respective supplies (a fuel gas, a raw gas, water, a combustible gas such as an off-gas, and air). A configuration for regulating a flow rate may be a supply pump (drive means) capable of changing a discharge flow rate of a supply or a fluid control mechanism including a combination of a supply source and a valve for regulating a flow rate of a supply disposed in a downstream-side flow channel.

Operation of the respective units of the hydrogen generator including the foregoing configuration is now described.

The burner 4 mixes the fuel gas with air and subjects the gas mixture to a high voltage electric discharge (a configuration for the electric discharge is not shown), thereby building a fire and generating a high-temperature combustion exhaust gas, and supplies the gas to the combustion exhaust gas flow channel 16.

The water evaporation unit 7 which has received water and a raw material vaporizes water by the heat from the combustion exhaust gas in the combustion exhaust gas flow channel 16 flowing through the inner side of the water evaporation unit 7 through heat exchange. Concurrently, the steam is mixed with the raw gas flowing through the same flow channel in the water evaporation unit 7, and a resultant gas is fed as a gas mixture to the reforming catalyst layer 9. The reforming catalyst layer 9 is heated (generally to 600 to 700° C.) by the high-temperature combustion exhaust gas flowing on the inner side of the reforming catalyst layer 9. The gas mixture containing the raw gas and the steam is supplied to the reforming catalyst layer 9, whereby a reformed gas containing hydrogen, carbon monoxide, and carbon dioxide is produced by steam-reforming reaction.

The conversion catalyst layer 10 is maintained at a temperature (150 to 300° C.) optimal for shift reaction by the heat exchange with the water evaporation unit 7 located adjacent to and on an inner side of the catalyst layer 10. A high concentration of carbon monoxide (10 to 15%) in the reformed gas is converted into carbon dioxide, whereby the concentration of carbon monoxide is reduced to a low level (around 0.5%). The selective oxidation catalyst layer 11 is also maintained at a temperature (around 150° C.) optimal for selective oxidizing reaction by the heat exchanged with the water evaporation unit 7 located adjacent to and on an inner side of the selective oxidation catalyst layer 11. The air supplied from the selective oxidation air supply unit 14 is mixed into the converted gas, whereby the carbon monoxide in the converted gas is reduced to an ultra-low concentration of 10 ppm or less by selective oxidation reaction.

When driving load (i.e., an amount of hydrogen produced) of the hydrogen generator is changed, the control unit 15 changes supply conditions so as to adapt to the driving load. For example, when there is received a command for changing a condition (TDR 50) for producing an amount of hydrogen that is 50% of a rated condition to a condition (TDR 100) for producing an amount of hydrogen conforming to the rated condition, the raw gas supply unit 5, the water supply unit 6, and the selective oxidation air supply unit 14 are controlled according to a signal from the control unit 15, whereby the amount of raw gas, the amount of water supply, and the amount of selective oxidization air are increased.

At this time, water evaporation unit 7 increases the amount of water from the condition under which water necessary for the TDR 50 has been supplied to an amount of water required for the TDR 100 (e.g., 10 g/min). In general, the amount of water required for TDR 100 is approximately twice the amount of water required for TDR 50 (e.g., 5 g/min). Therefore, an evaporation completion point in the water evaporation unit 7 shifts downstream.

Specifically, under TDR 50, water at a room temperature (about 20° C.) supplied from the water supply unit 6 enters the water evaporation unit 7 and is warmed by receiving heat of an exhaust gas flowing through the combustion exhaust gas flow channel 16, heat of the selective oxidation catalyst layer 11, and heat of the conversion catalyst layer 10. As a result, the evaporation of the water completely finishes in a vicinity of a midstream portion of the conversion catalyst layer 10, whereby the water turns into steam having a temperature of 100° C. or more.

However, when the amount of water is supplied under TDR 100 which is twice the amount of water, the evaporation of the water does not finish in the vicinity of the midstream portion of the conversion catalyst layer 10, and the water is in a steam-liquid two-layer state having a temperature of 100° C. in the midstream portion. The water flows further downstream, to thus receive heat of the conversion catalyst layer 10 and heat of the combustion exhaust gas, whereby evaporation of water is completed at the exit of the conversion catalyst layer 10 and at a further downstream portion.

Since the reforming catalyst layer 9 exists downstream of the water evaporation unit 7 at this time, the evaporation completion point deviates downstream, and the evaporation of the water finishes in the reforming catalyst layer 9 after exiting the water evaporation unit 7. At this time, liquid water having a temperature of 100° C. is supplied to the reforming catalyst layer 9. Since evaporation requires latent heat, a great amount of heat of a surrounding catalyst will be absorbed, and the catalyst may come to a temperature of 100° C.

In particular, when the evaporation completion point is situated in the midstream portion of the conversion catalyst layer 10 under TDR 50, the temperature of the steam increases because of sensible heat at a downstream portion with respect to the evaporation completion point. Therefore, an upstream portion of the reforming catalyst layer 9 is at a high temperature of 400° C.

If the amount of water has increased from this state as in TDR 100 such that the state is suddenly changed to a state in which the evaporation completion point is located in the reforming catalyst layer 9, the temperature of the upstream portion of the reforming catalyst layer 9 sharply falls from 400° C. to 100° C. When thermal shock due to a temperature fall is applied to the catalyst, cracking of the catalyst may occur.

Further, a temperature fall may occur in the entire catalyst layer thereby causing a temperature of the entire catalyst layer to fall, or a temperature distribution including a locally low temperature may occur due to a local temperature fall. If such a temperature state occurs, reforming reaction of the reforming catalyst layer 9 will not be stably, sufficiently performed. As a result, the amount of hydrogen produced will become smaller, or the amount of hydrogen produced will become unstable.

In the present invention, in order to promote heat transfer in the downstream portion of the water evaporation unit 7 so as to prevent occurrence of such a failure, the pitch of the helical round bar 8 in the downstream portion of the water evaporation unit 7 is made smaller than the pitch in a portion except the downstream portion of the water evaporation unit 7. A reduction in pitch can prolong a time during which the water flowing along the helical round bar 8 reaches the reforming catalyst layer 9, which can prolong a time for the water to receive heat from the combustion exhaust gas, the conversion catalyst layer 10, and surrounding high-temperature areas. Consequently, water is completely evaporated before reaching the reforming catalyst layer 9.

Accordingly, the pitch of the helical round bar 8 formed in the downstream portion of the water evaporation unit 7 is made smaller than the pitch in the portion except the downstream portion of the water evaporation unit 7, whereby the helical flow channel in the downstream portion of the water evaporation unit 7 becomes longer. A traveling time of the water flowing through the helical flow channel also becomes longer, and the amount of heat exchange between the downstream portion of the water evaporation unit 7 and the combustion exhaust gas flow channel 16 corresponding to the downstream portion becomes greater. By the increase of the amount of heat exchange, water is completely evaporated, and supply of droplets to the reforming catalyst layer 9 is prevented, so that performance of the hydrogen generator can be stabilized.

In the embodiment, the pitch between the flow channel member (the round bar 8) of the water evaporation unit 7 is changed according to the amount of heat exchange between the combustion exhaust gas channel 16 and the water evaporation unit 7. In addition, the pitch of the flow channel member (the round bar 8) of the water evaporation unit 7 in the portion where an increase in the amount of heat exchange is desired is made small. Consequently, the temperature of the reforming catalyst layer can be maintained appropriately, and the performance of the hydrogen generator can be stabilized.

The amount of heat exchange referred to in the present embodiment means an amount of heat exchange per unit area.

Second Embodiment

Figure 2:
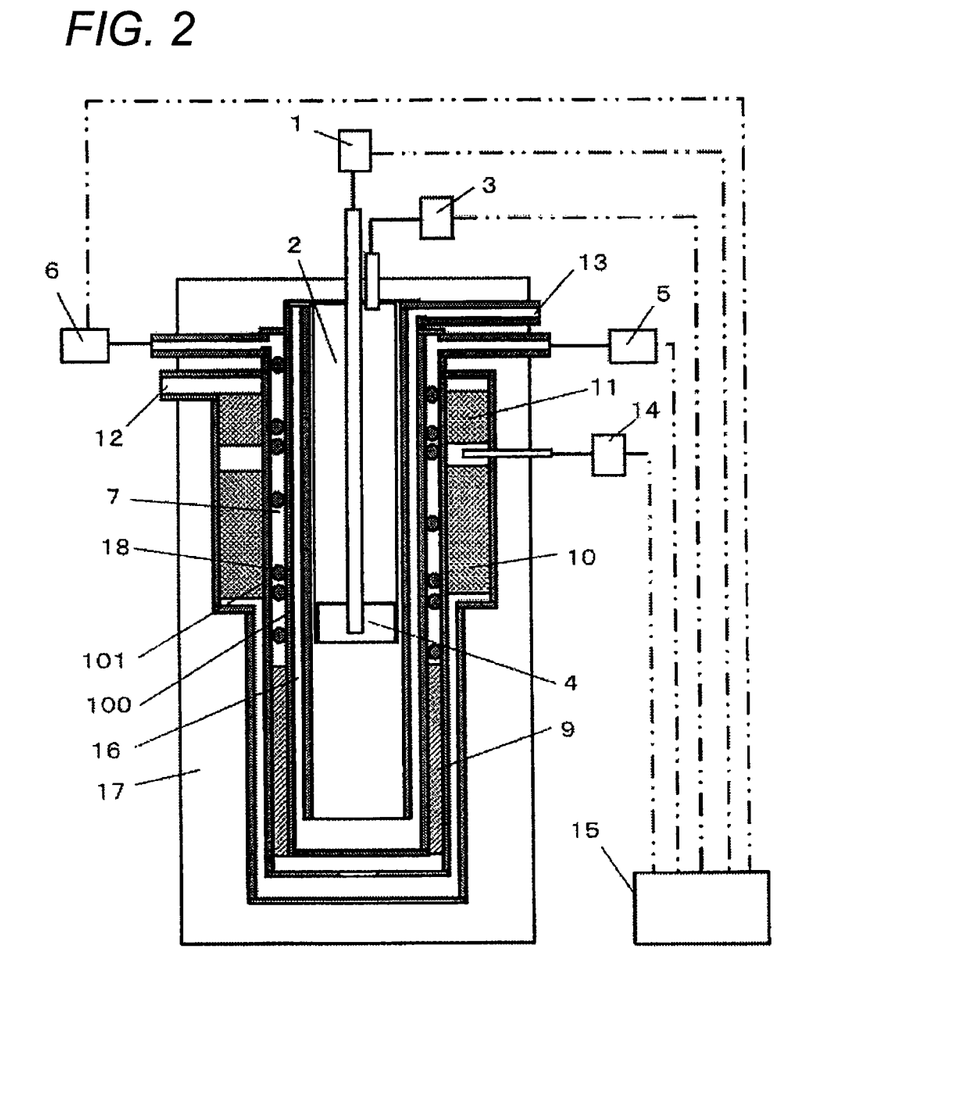
FIG. 2 is a schematic diagram showing a hydrogen generator of a second embodiment of the present invention.

FIG. 2 shows a hydrogen generator of a second embodiment of the present invention. The structure of the water evaporation unit 7 of the second embodiment differs from that of the first embodiment shown in FIG. 1.

In FIG. 2, the water evaporation unit 7 is configured such that in the vicinity of the conversion catalyst layer 10, the pitch of the metallic round bar 18 serving as a helical partition portion of the water evaporation unit 7 adjacent to an upstream portion the conversion catalyst layer 10 in a flow of the reformed gas, is made smaller than the pitch of the helical round bar 18 located adjacent to a portion of the conversion catalyst layer 10 except the upstream portion thereof.

Further, the water evaporation unit 7 is configured such that in the vicinity of the selective oxidation catalyst layer 11, the pitch of the metallic round bar 18 serving as the helical partition portion of the water evaporation unit 7 adjacent to an upstream portion of the selective oxidation catalyst layer 11 in a flow of the reformed gas is made smaller than the pitch of the helical round bar 18 located adjacent to a portion of the selective oxidation catalyst layer 11 except the upstream portion thereof.

The conversion catalyst layer 10 receives the reformed gas from the reforming catalyst layer 9, whereby the amount of CO of 10 to 15% contained in the reformed gas is reduced to 0.5% by shift reaction. Shift reaction is exothermic reaction and mostly takes place in the upstream portion of the conversion catalyst layer 10 supplied with the reformed gas.

Figure 3:
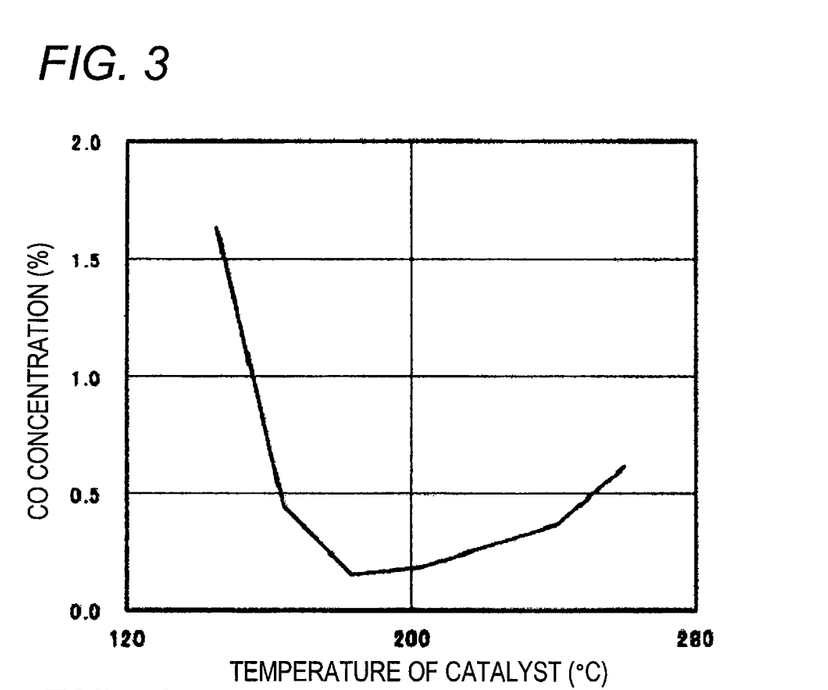
FIG. 3 is a characteristic chart of a conversion catalyst.

FIG. 3 shows a CO characteristic chart with respect to the temperature of the conversion catalyst. It is seen from FIG. 3 that CO concentration increases at both an excessively high temperature and an excessively low temperature.

The hot reformed gas is supplied from the reforming catalyst layer 9 to the conversion catalyst layer 10. After the gas is subject to exothermic reaction in the upstream portion of the conversion catalyst layer 10, the gas flows toward a downstream portion while accompanied by transfer of heat to the water evaporation unit 7 and dissipation of heat to external surroundings of the conversion catalyst layer. Hence, the temperature decreases from the upstream portion to the downstream portion of the conversion catalyst layer. The concentration of CO in the converted gas supplied from the conversion catalyst layer 10 represents a characteristic, such as that shown in FIG. 3, according to the temperature of the catalyst at the exit of the conversion catalyst layer 10. Accordingly, when the temperature of the exit of the conversion catalyst layer becomes too low, CO in the converted gas comes to 0.5% or more.

Accordingly, the exit of the conversion catalyst layer 10 is configured so as to assume a temperature at which the concentration of CO does not exceed 0.5%. However, the temperature of the exit of the conversion catalyst layer is set to a certain level so as not to become too low, the temperature of the upstream portion of the conversion catalyst layer 10 also increases correspondingly. If the temperature of the catalyst is excessively high, catalyst (Cu—Zn, Fe—Cr, or the like) on a catalyst carrier that exhibits catalytic reaction becomes larger through aggregation, which deteriorates a catalytic characteristic. Therefore, it is necessary to prevent excessively high temperature of the catalyst so as not to exceed a heat resistance temperature at which the catalytic characteristic becomes worse.

To this end, a temperature increase in the upstream portion of the catalyst layer has to be reduced while the temperature of the downstream portion of the catalyst layer is set to a high level to some extent. As described in the second embodiment shown in FIG. 2, the pitch of the helical round bar 18 in the upstream portion of the conversion catalyst layer 10 is made smaller than the pitch of the round bar 18 in the portion of the conversion catalyst layer 10 except the upstream portion thereof, thereby making longer a period of time during which water or steam having a low temperature flows through the water evaporation unit 7. The amount of heat exchange between the water evaporation unit 7 and the upstream portion of the conversion catalyst layer 10 is thereby increased.

In that case, the temperature of the conversion catalyst layer 10 can be suppressed so as not to exceed the heat resistance temperature of the catalyst. Also, the temperature of the downstream portion of the conversion catalyst layer 10 can be maintained to a higher level, so that the stable characteristic of the hydrogen generator can be maintained.

The selective oxidation catalyst layer 11 receives the converted gas from the conversion catalyst layer 10 and air from the selective oxidation air supply unit 14, whereby the amount of CO of 0.5% contained in the converted gas is reduced to 10 ppm or less by means of selective oxidation reaction. The selective oxidation reaction is also exothermic reaction and immediately takes place when the converted gas and the air is supplied to the selective oxidation catalyst layer 11.

Figure 4:
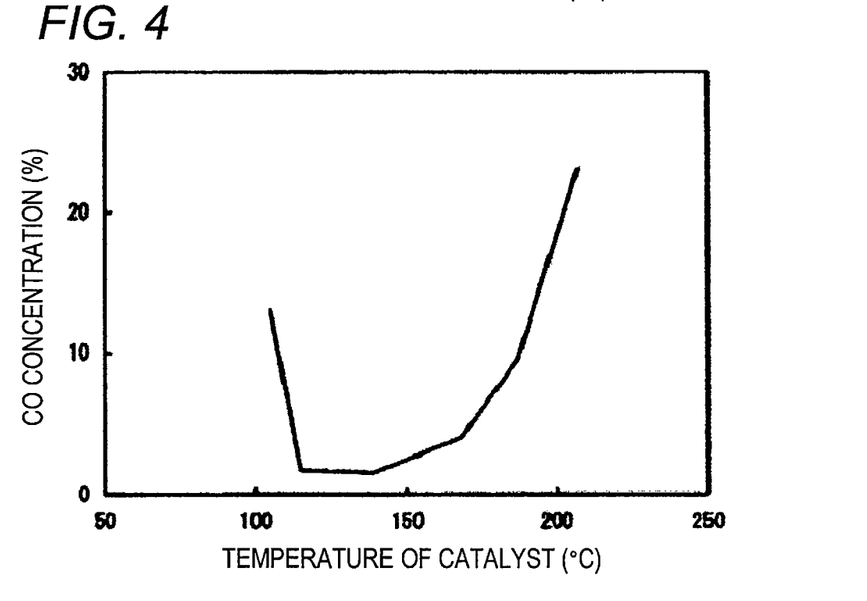
FIG. 4 is a characteristic chart of a selective oxidation catalyst.

FIG. 4 shows a CO characteristic chart with respect to the temperature of the selective oxidation catalyst. According to FIG. 4, the amount of CO is understood to become high even when the temperature is excessively high or low. Like the conversion catalyst layer 10, the temperature of the selective oxidation catalyst layer 11 decreases from the upstream portion to the downstream portion after exothermic reaction occurred in the upstream portion of the selective oxidation catalyst layer 11 by means of transfer of heat to the water evaporation unit 7 and dissipation of heat to external surroundings.

Selective oxidation reaction ends at the upstream portion after having entered the selective oxidation catalyst layer 11. Therefore, a state of CO at the exit of the selective oxidation catalyst layer 11 is determined by the temperature of the upstream portion. It is preferable that the upstream portion is set in a temperature state in which a superior CO characteristic shown in FIG. 4 is exhibited. However, if the temperature is excessively decreased, the temperature of the exit of the selective oxidation catalyst layer 11 also decreases, so that the temperature of the produced gas exiting from the selective oxidation catalyst layer 11 also decreases.

When the temperature of the produced gas comes to a level equal to a dew point or less due to excessive decrease of the temperature of the produced gas, dew condensation of steam in the produced gas may occur. If dew condensation occurs and if dew-condensed water is supplied to the selective oxidation catalyst layer 11, the heat of the catalyst having a high temperature will be absorbed by re-evaporation of dew-condensed water, whereupon the temperature of the catalyst decreases.

The temperature balance of the selective oxidation catalyst layer 11 is then lowered, thereby causing a temperature in the upstream portion of the selective oxidation catalyst layer to be lowered, which may avoid CO contained in the produced gas from being reduced to a level of 10 ppm or less. Moreover, water (the due-condensed water) evaporates at a location differing from a usual location. For this reason, a great volumetric change occurs due to transformation from water to steam at the evaporation, and a stable characteristic of the entire hydrogen generator can not be maintained for reasons of turbulence (pulsation) in a gas flowing in the interior of the hydrogen generator.

Accordingly, in order to prevent an increase in the temperature of the upstream portion of the catalyst layer while a temperature fall in the downstream portion of the selective oxidation catalyst layer 11 is suppressed, the amount of heat exchange between the water evaporation unit 7 and the upstream portion of the selective oxidation catalyst layer 11 has to be increased. As described in the embodiment, the pitch of the helical round bar 18 in the upstream portion of the selective oxidation catalyst layer 11 is made smaller than the pitch of the round bar 18 in the portion of the selective oxidation catalyst layer 11 except the upstream portion thereof, thereby making the period of time during which low-temperature water or steam flows through the water evaporation unit 7 longer than the period of time during which the water or steam flows through the remaining portion of the selective oxidation catalyst layer 11, whereby the amount of heat exchange between the water evaporation unit 7 and the selective oxidation catalyst layer 11 is increased. An increase in the temperature of the upstream portion of the selective oxidation catalyst layer 11 is thereby prevented, so that a temperature distribution from the upstream portion to the downstream portion can be made smaller. Thus, stable operation of the hydrogen generator can be realized.

In the present embodiment, the pitch between the flow channel member (the round bar 8) of the water evaporation unit 7 is changed according to the amount of heat exchange between the combustion exhaust gas flow channel 16 and the carbon monoxide reduction unit (the conversion catalyst layer 10 and the selective oxidation catalyst layer 11). Moreover, the pitch between the flow channel member (the round bar 8) of the water evaporation unit 7 is made smaller at a location where an increase in the amount of heat exchange is desired. As a result, the temperature of the reforming catalyst layer can be maintained appropriately, and performance of the hydrogen generator can be stabilized.

The amount of heat exchange referred to herein means the amount of heat exchange per unit area.

In the embodiment, both the pitch of the helical round bar 18 in the upstream portion of the conversion catalyst layer 10 and the pitch of the helical round bar 18 in the upstream portion of the selective oxidation catalyst layer 11 are made smaller. However, the pitches may be configured separately so as to adapt to the hydrogen generator. For example, only the pitch of the round bar 18 in the upstream portion of the conversion catalyst layer 10 may also be made smaller, or only the pitch of the round bar 18 in the upstream portion of the selective oxidation catalyst layer 11 may be made smaller.

The structure in which the first embodiment and the second embodiment are simultaneously performed in combination may be adopted.

In the embodiments, the flow channel in the water evaporation unit 7 is formed by use of the helical round bars 8 and 18. However, a material having any shape, such as a helical plate-like or pipe-like material, may also be used for forming the flow channel, so long as the material enables smooth flow of water by means of a helical shape having a partitioning function.

Moreover, stable operation of the fuel cell power generator becomes possible, by providing the fuel cell power generator with the hydrogen generator described in the first embodiment or the second embodiment.

The present invention is not limited to the descriptions provided for the embodiments and is scheduled to be subjected to modifications and alterations conceived by the persons having ordinal skill in the art based on the descriptions of the specification and the well-known techniques. The modifications and alterations shall fall within a range in which protection is sought.

The present invention is based on Japanese Patent Application (Application No. JP 2008-128024) filed on May 15, 2008, the entire subject matter of which is incorporated herein by reference.

INDUSTRIAL APPLICABILITY

The hydrogen generator of the present invention realizes stable supply of hydrogen in the form of equipment that is compact, highly efficient and achieves low cost. The hydrogen generator is useful, for example, as equipment for supplying a produced gas containing hydrogen to a home fuel cell system.

DESCRIPTION OF REFERENCE SKINS

1 FUEL GAS SUPPLY UNIT
2 AIR FLOW CHANNEL
3 AIR FAN
4 BURNER
5 RAW GAS SUPPLY UNIT
6 WATER SUPPLY UNIT
7 WATER EVAPORATION UNIT
8, 18 ROUND BAR
9 REFORMING CATALYST LAYER
10 CONVERSION CATALYST LAYER
11 SELECTIVE OXIDATION CATALYST LAYER
12 PRODUCED GAS EXIT
13 OUTLET
14 SELECTIVE OXIDATION AIR SUPPLY UNIT
15 CONTROL UNIT
16 COMBUSTION EXHAUST GAS FLOW CHANNEL
17 INSULATING MATERIAL
100 CYLINDER
101 CYLINDER

The invention claimed is:

1. A hydrogen generator comprising:
a raw material supply unit configured to supply a raw gas;
a water supply unit configured to supply water;
a water evaporation unit connected to the raw material supply unit and the water supply unit and configured to transform supplied water into steam and to mix the steam with the raw gas;
a burner connected to a fuel supply unit configured to supply a fuel gas and an air supply unit configured to supply combustion air;
a combustion exhaust gas flow channel which is provided on an inner side than the water evaporation unit and through which a combustion exhaust gas from the burner flows;
a reforming catalyst layer configured to receive a gas mixture supplied from the water evaporation unit and produce a reformed gas containing hydrogen by steam-reforming reaction of the gas mixture with a reforming catalyst; and
a carbon monoxide reduction unit disposed on an outer side than the water evaporation unit and configured to receive the reformed gas and reduce an amount of carbon monoxide contained in the reformed gas,
wherein the water evaporation unit comprises a flow channel member provided on an outer side than the combustion exhaust gas flow channel and defining a flow channel through which the raw gas and the water flow, the flow channel member having an upstream portion and a downstream portion with respect to the direction of the flow of the raw gas and the water,
wherein the flow channel member of the water evaporation unit comprises double cylinders and a helical partition portion sandwiched between the cylinders,
wherein a pitch of the helical partition portion is smaller in the downstream portion of the flow channel member of the water evaporation unit than in the upstream portion of the flow channel member of the water evaporation unit, and
wherein an amount of heat exchange between the combustion exhaust gas flow channel and the water evaporation unit is higher in the downstream portion of the flow channel member of the water evaporation unit than in the upstream portion of the flow channel member of the water evaporation unit.

2. The hydrogen generator according to claim 1, wherein the helical partition portion comprises a metallic round bar.

3. A hydrogen generator system comprising:
a hydrogen generator configured to generate a produced gas containing a high concentration of hydrogen; and
a fuel cell configured to generate electric power by using hydrogen generated by the hydrogen generator, wherein the hydrogen generator includes:
a raw material supply unit configured to supply a raw gas,
a water supply unit configured to supply water,
a water evaporation unit connected to the raw material supply unit and the water supply unit and configured to transform supplied water into steam and to mix the steam with the raw gas,
a burner connected to a fuel supply unit configured to supply a fuel gas and an air supply unit configured to supply combustion air,
a combustion exhaust gas flow channel which is provided on an inner side than the water evaporation unit and through which a combustion exhaust gas from the burner flows,
a reforming catalyst layer configured to receive a gas mixture supplied from the water evaporation unit and produce a reformed gas containing hydrogen by steam-reforming reaction of the gas mixture with a reforming catalyst, and
a carbon monoxide reduction unit disposed on an outer side than the water evaporation unit and configured to receive the reformed gas and reduce an amount of carbon monoxide contained in the reformed gas,
wherein the water evaporation unit comprises a flow channel member provided on an outer side than the combustion exhaust gas flow channel and defining a flow channel through which the raw gas and the water flow, the flow channel member having an upstream portion and a downstream portion with respect to the direction of the flow of the raw gas and the water,
wherein the flow channel member of the water evaporation unit comprises double cylinders and a helical partition portion sandwiched between the cylinders,
wherein a pitch of the helical partition portion is smaller in the downstream portion of the flow channel member of the water evaporation unit than in the upstream portion of the flow channel member of the water evaporation unit, and
wherein an amount of heat exchange between the combustion exhaust gas flow channel and the water evaporation unit is higher in the downstream portion of the flow channel member of the water evaporation unit than in the upstream portion of the flow channel member of the water evaporation unit.

* * * * *